United States Patent [19]

Eranosian, deceased

[11] 4,278,386
[45] Jul. 14, 1981

[54] STRUCTURE FOR SUPPORTING COOKING POT FOR RE-FRIED BEANS

[76] Inventor: John Eranosian, deceased, late of Woodside, Calif., by Florence Eranosian, executrix

[21] Appl. No.: 137,621

[22] Filed: Apr. 7, 1980

Related U.S. Application Data

[63] Continuation of Ser. No. 894,751, Apr. 10, 1978, abandoned.

[51] Int. Cl.³ ............................................. B65G 65/34
[52] U.S. Cl. .................................... 414/421; 248/142
[58] Field of Search ............... 414/421; 248/140–142; 222/166

[56] References Cited

U.S. PATENT DOCUMENTS

| | | | |
|---|---|---|---|
| 1,220,640 | 3/1917 | Kelly | 414/421 X |
| 1,326,077 | 12/1919 | Manahan | 248/142 |
| 2,463,171 | 3/1949 | Guggenheim | 248/140 X |
| 3,235,212 | 2/1966 | Baumiller | 414/421 X |
| 3,347,399 | 10/1967 | Ensinger | 414/421 |

Primary Examiner—Robert G. Sheridan
Attorney, Agent, or Firm—Phillips, Moore, Weissenberger, Lempio & Majestic

[57] ABSTRACT

A structure for supporting a pot containing material such as food therein is pivotally attached to a base, with a ratchet mechanism operatively connecting the structure and base for providing that the pot may be pivoted to and held in a variety of positions, so that food may be readily transferred from the pot into smaller containers.

10 Claims, 6 Drawing Figures

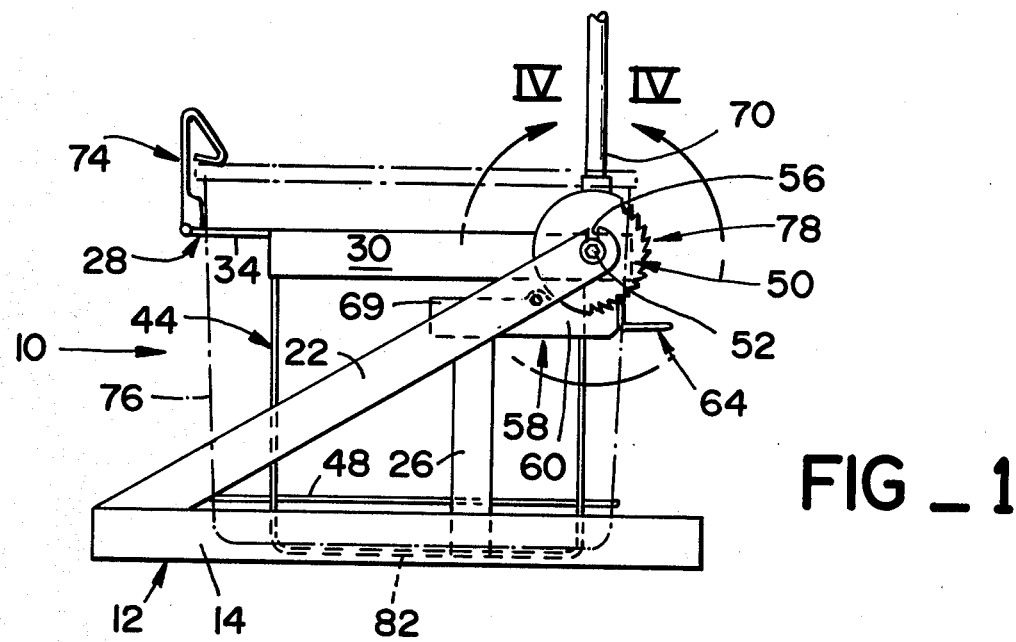
FIG_1
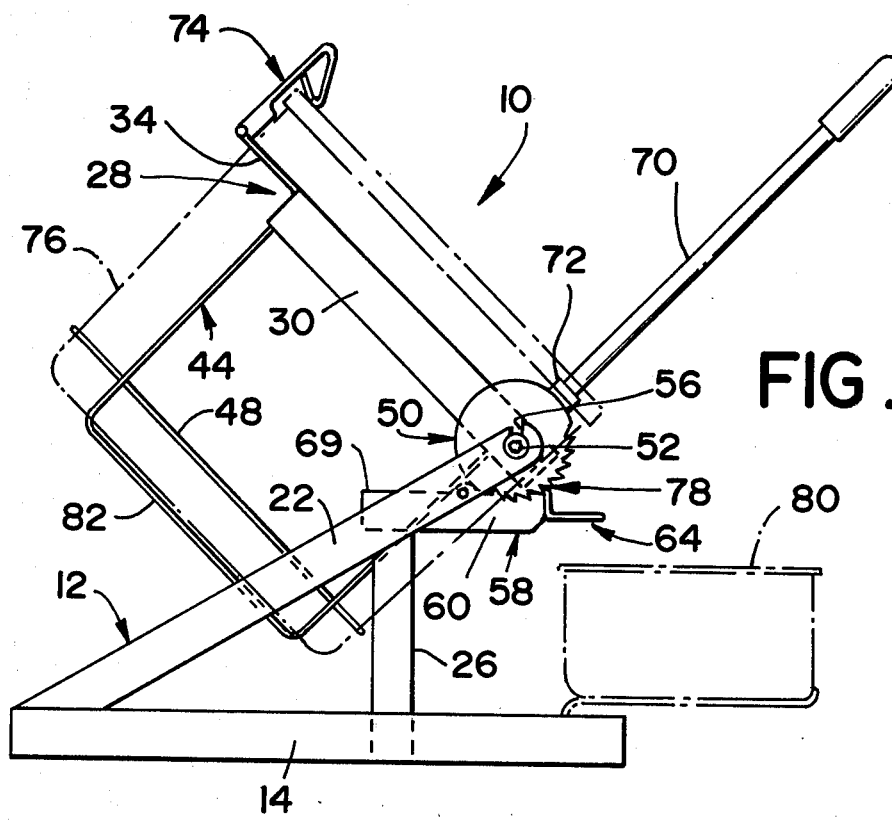
FIG_2

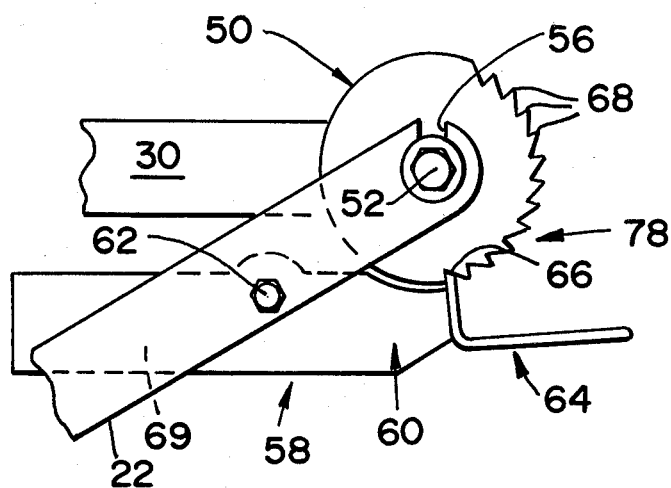
FIG_4
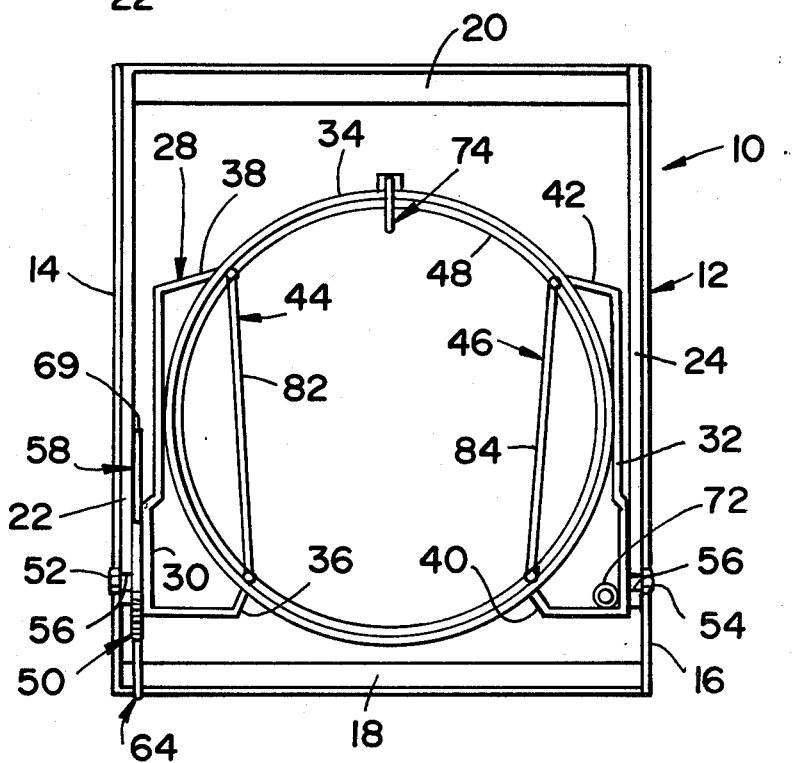
FIG_3
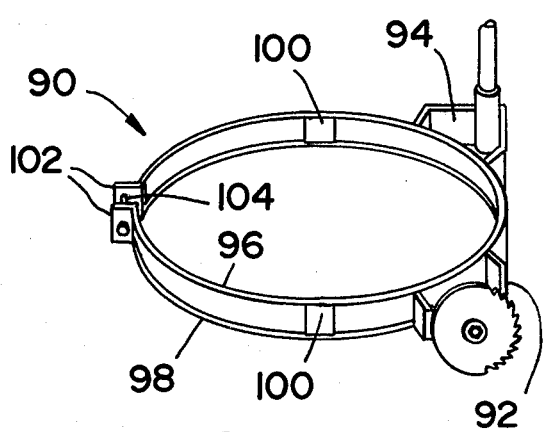
FIG_5
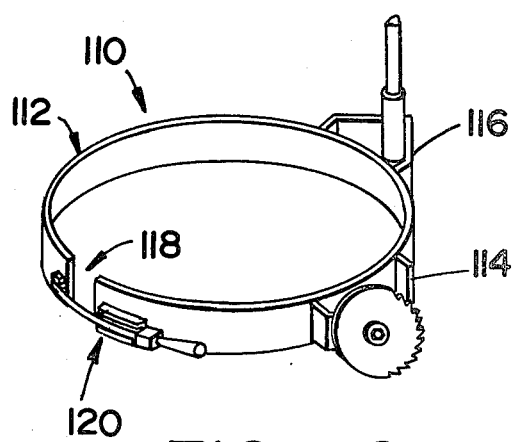
FIG_6

STRUCTURE FOR SUPPORTING COOKING POT FOR RE-FRIED BEANS

This is a continuation of Ser. No. 894,751, filed Apr. 10, 1978, now abandoned.

BACKGROUND OF THE INVENTION

This invention relates to a material handling apparatus, and more particularly, to a material handling apparatus including a ratchet mechanism for selectively positioning a pivotal support frame.

In restaurants of the type providing fast service, it is well known to provide large pots in which food is held over a source of heat, so that food is continuously at the proper serving temperature. For example, such a pot may be substantially filled with re-fried beans or the like.

In the handling of such food, smaller portions are ladled out from the pot into a smaller container, and the container is placed directly in front of the server of the food, so that much server has ready access thereto in the preparation of the final product.

It will readily be seen that the continued ladling of food from the large pot to the smaller container is a relatively inefficient and time-consuming operation. However, such is the method generally in use, because of the difficulty in handling the large pot itself so as to transfer food therefrom to the smaller container.

It is accordingly an object of this invention to provide food handling apparatus which may be used so as to easily provide transfer of food from a large pot to a smaller container, in an easy, efficient and convenient manner.

It is a further object of this invention to provide apparatus which, while fulfilling the above object, is extremely simple in design and construction.

SUMMARY OF THE INVENTION

Broadly stated, the apparatus for handling material such as food comprises a base, and a support frame pivotally mounted to the base, and configured to support a material carrying body. A ratchet mechanism operatively connects with the base and support frame for selectively holding the support frame and a material-carrying body supported thereby in a variety of positions relative to the base.

BRIEF DESCRIPTION OF THE DRAWINGS

These and other objects of the invention will become apparent from a study of the following specification and drawings, in which:

FIG. 1 is a side elevation of a first embodiment of apparatus, shown with the food-holding pot in a vertical position.

FIG. 2 is a view smaller to that shown on FIG. 1, but with the pot held in an angled position.

FIG. 3 is a plan view of the apparatus shown in FIG. 1, but with the pot removed therefrom.

FIG. 4 is an enlarged view of the area for IV—IV of FIG. 1.

FIG. 5 is a perspective view of a second embodiment of the support frame of the apparatus; and FIG. 6 is a perspective view of a third embodiment of the support frame of the apparatus.

DESCRIPTION OF THE PREFERRED EMBODIMENTS

Shown in FIGS. 1–3 is the overall apparatus 10 for handling material such as food. The apparatus includes a base 12 having side members 14, 16 and connecting members 18,20 fixed thereto as best shown in FIG. 3. The base 12 is thus rectangular in form. Angled members 22,24 are fixed to the respective side members 14,16 extending upwardly from such side members 14,16. Structural members 26 interconnect the respective side members 14,16 and angled members 22,24 for positive support thereof.

Operatively associated with the base 12 is a support frame 28. The support frame 28 includes a pair of spaced brackets 30,32, with an upper ring member 34 secured to the opposite ends 36,38 of the bracket 30 and also the opposite ends 40,42 of the bracket 32. A generally U-shaped brace member 44 has one end portion fixed to the ring member 34 and the end 36 of the bracket 30 and the other end portion fixed to the ring member 34 and to the end 38 of the bracket 30. Another generally U-shaped brace member 46 is similarly connected with the ring member 34 and other bracket 32. A second ring member 48 is secured to the brace members 44,46 inwardly thereof, as best shown in FIG. 3. Thus, the brace members 44,46 interconnect the ring members 34,48.

The bracket 30 has fixed thereto a toothed wheel 50, and a bolt member 52 extends from the center of the toothed wheel 50 outwardly therefrom. The opposite bracket 32 also has a bolt member 54 extending outwardly therefrom, and it will be seen that the bolt members 52, 54 may be seated in vertical recesses 56 provided at the respective ends of the upwardly angled members 22, 24. Pivotally fixed (FIG. 4) to the upwardly angled member 22 adjacent the recess 56 therein is an arm assembly 58 including an arm 60 which extends on both sides of the pivot 62. One end has fixed thereto an actuating member 64 having an edge portion 66 which may engage with individual recesses between the teeth 68 of the toothed wheel 50. The other end 69 extends sufficiently to provide that the weight thereof tends to urge the edge portion 66 into engagement with the teeth 68 of the toothed wheel 50.

An elongated handle 70 is secured to a collar 72 mounted to the other bracket 32. The handle 70 may be readily removed from the collar 72 and bracket 32 through a simple socket or a threaded connection, for example, between the end of the handle 70 and collar 72.

A retaining member 74 is pivotally mounted to the ring member 34 of the support frame 28. The retaining member 78 is of spring material, and is movable to a first position removed from a pot 76 supported by the frame 28 and movable to a second position as shown in FIGS. 1 and 2 to retain the material-carrying pot 76 on the frame 28, by bearing on the upper edge thereof.

In the use of the apparatus 10, the base 12 is placed on a stove, so that the food-carrying pot 76 is appropriately positioned over the source of heat. The pot 76 may be held in a generally vertical position through appropriate use of the ratchet mechanism 78 made up of the toothed wheel 50 and arm assembly 58. The retaining member 74 is in position so as to hold the pot 76 on the support frame 28. If it is desired that food be transferred from the pot 76 to a smaller container 80 (FIG. 2) for convenient serving thereof, force is applied to the handle 70 by the user of the apparatus 16 so that the support frame 28 and pot 76 are pivoted to the position shown in FIG. 2. It will be seen that the teeth 68 are shaped so that such frame 28 and pot 76 are readily movable in that direction, the edge portion 66 merely riding over the teeth 68 as such pivoting takes place. Meanwhile, because of the excess weight provided by the extended end 69 of arm assembly 58, such edge portion 66 remains in close communication with the teeth 68.

It will be seen that pouring of food from the pot into the smaller container 80 may be readily controlled by the user of the apparatus 10. Meanwhile, if it is desired that the pot 76 be held in an angled position, the user of the apparatus 10 need merely release his force on the handle 70 and the weight of the food-carrying pot 76 and support frame 28 will tend to rotate the pot 76 toward its vertical position. Due to the shape of the teeth 68 on the toothed member 50, the ratchet mechanism 78 now operates to hold the pot 76 at a chosen angle. While such pot 76 is being held at a chosen angle, it will be readily seen that heat from the stove is still being provided thereto so that the food is maintained at a proper temperature.

It will be readily seen that the pot 76 and support frame 28 may be supported in a variety of positions relative to the base 12. If it is desired that the pot 76 be returned to its vertical position, the operator, while holding the extended end of the handle 70, need merely move the actuating member of the arm assembly 58 downward, removing the edge portion 66 from the toothed wheel 50, and slowly allow movement of the pot 76 and support frame 28 to the vertical position, through controlled use of the handle 70.

The overall apparatus 10 lends itself to extremely convenient use, in particular because of the ratchet mechanism 78 which allows easy and convenient movement, meanwhile providing that the pot 76 may be held properly in a variety of positions as chosen. The pivotal retaining member 74 provided insures that the pot 76 is properly held as desired on the support frame 28. The spacing of the teeth 68 may be chosen so that upon engagement of a pair of successive teeth 68 with the edge portion 66, with the pot 76 moved in a pouring direction, the pot 76 pours an amount sufficient to substantially fill a container 80.

It will also be seen that the particular design of support frame 28 in this embodiment in extremely simple and light, yet providing a high degree of rigidity and support for the food carrying pot 76, it being particularly noted that the brace members 44,46 have portions 82,84 thereof positioned along the bottom of such a material-carrying pot 76.

Shown in FIG. 5 is a second embodiment of support frame 90 of the apparatus. Such support frame 90 includes smaller brackets 92,94 generally similar to the brackets 30,32. A pair of generally ring-shaped members 96,98 are included, each being fixed to both brackets 92,94 as shown. The generally ring-shaped members 96,98 are connected by brace members 100, and have corresponding extended ends which are fixed together by brace members 102, so that the generally ring-shaped members 96,98 can be adjusted slightly in size so as to properly fit the upper portion of a food-carrying pot, whereby the pot may be properly supported and carried on the support frame 90. For example, the pot may be positioned on the support frame 90, and subsequently the nut-and-bolt 104 assembly may be tightened so that the generally ring-shaped members 96,98 tighten on the pot for proper holding thereof.

Shown in FIG. 6 is yet another embodiment of a support frame 110. In this embodiment, a single generally ring-shaped member 112 of flat cross-section is fixed to both brackets 114,116, similar to the brackets 92,94 of FIG. 5. The generally ring-shaped member 112 has an open portion 118 which is spanned by an over-center type latch 120. With the latch 120 opened, the pot may be placed on the support frame 110, and subsequently the latch 120 is actuated to draw the member 112 tightly about the pot, so that it is held properly on the support frame 110.

In each embodiment, the pivot axis of the apparatus is above and to one side of the center of gravity of the pot (and material therein), to provide that the bottom of the pot rises as the pot is pivoted.

It will be readily seen that each of the embodiments of apparatus is highly effective in use.

What is claimed is:

1. Apparatus for cooking and dispensing food comprising:
   a base having a pair of side members, a pair of connecting members fixed to said side members to form a rectangle, a pair of angled members each having one end fixed to one end of a respective side member and extending upwardly therefrom and a pair of structural members each interconnecting a respective side member and angled member intermediate their ends for positive support thereof;
   a support frame pivotally mounted on the other ends of said angled members and configured to support a hot food carrying body for tilting movement about an axis which is above and to one side of the center of a hot food carrying body supported thereby; and
   a ratchet mechanism comprising a toothed wheel rigidly connected to one of said base and support frame and an arm pivotally mounted to the other of said base and support frame for allowing free pivotal movement of the support frame about said axis to raise the center of gravity of a hot food carrying body supported thereby relative to the base by tilting movement while holding the support frame against pivotal movement in the opposite direction about said axis to maintain the center of gravity of a hot food carrying body supported thereby in a variety of elevated positions relative to the base.

2. The apparatus of claim 1 wherein said toothed wheel is rigidly mounted on said support frame and said arm is pivotally mounted on said base.

3. The apparatus of claim 2 further comprising a retaining member pivotally mounted to the support frame, and pivotable to a first position to hold a supported hot food-carrying body on the support frame, and pivotable to a second position allowing removal of a supported hot food-carrying body from the support frame.

4. The apparatus of claim 2 wherein the support frame comprises a pair of brackets, and a ring member secured to each of the pair of brackets.

5. The apparatus of claim 4 wherein the support frame further comprises a second ring member, and brace members interconnecting the first-mentioned and second ring members.

6. The apparatus of claim 5 wherein the brace members extend so as to have portions thereof positioned along the bottom of a hot food-carrying body supported by the support frame.

7. The apparatus of claim 6 wherein the ratchet mechanism comprises a toothed member secured to one of the pair of brackets, and an arm movably mounted to the base and operatively associated with the teeth of the toothed member.

8. The apparatus of claim 7 further comprising an elongated handle removably mounted to the other of the pair of brackets.

9. The apparatus of claim 4 further comprising means for selectively tightening the ring member on supported hot food-carrying body.

10. The apparatus of claim 4 further comprising a retaining member pivotally mounted to the support frame, and pivotable to a first position to hold a supported material-carrying body on the support frame and pivotable to a second position allowing removal of the supported material-carrying body from the support frame, and wherein the support frame comprises a pair of brackets, a second ring member, and brace members interconnecting the first-mentioned and second ring members, wherein the brace members extend so as to have portions thereof positioned along the bottom of a material-carrying body supported by the support frame, wherein the toothed member is secured to one of the pair of brackets, and further comprising an elongated handle removably mounted to the other of the pair of brackets.

* * * * *